3,618,449
VIEWFINDER MOUNTING ON SINGLE-LENS REFLEX CAMERAS

Kenji Hiruma and Sadanao Ando, Tokyo, Japan, assignors to Kabushiki Kaisha Ricoh, Tokyo, Japan
Filed Sept. 23, 1969, Ser. No. 860,234
Claims priority, application Japan, Oct. 3, 1968, 43/86,407; Dec. 6, 1968, 43/106,339
Int. Cl. G03b 13/02
U.S. Cl. 88—1.5                                   4 Claims

ABSTRACT OF THE DISCLOSURE

A viewfinder for single-lens reflex cameras upon which a penta-roof type reflecting mirror may be mounted through a mounting member without providing edges along the side walls of the mirror for mounting. The main body of the mirror may be correctly positioned relative to the camera body and the mirror is securely held in position at the portions exterior of the main body of the mirror so that no force is directly applied to the reflecting mirror upon mounting, thereby eliminating the distortion thereof.

BACKGROUND OF THE INVENTION

The present invention relates to a single-lens reflex camera and more particularly to a viewfinder therefor.

There has been proposed the use of a penta-roof type reflecting mirror instead of a pentaprism in a single-lens reflex camera. In order to mount a penta-roof type reflecting mirror upon a camera body generally outwardly extended flanges $1d$ are formed integral with the reflecting mirror as shown in FIG. 1 and the mirror is secured in position by means of setscrews through holes $1e$ formed through the flanges $1d$. However, the mirror surfaces and the edges of the penta-roof type reflecting mirror tend to be distorted when too much force is applied to tighten the setscrews, thereby distorting adversely the image viewed through the viewfinder.

Accordignly, one of the objects of the present invention is to eliminate any distortion of the reflecting mirror caused when the mirror is mounted upon the camera main body.

SUMMARY OF THE INVENTION

According to the present invention, a penta-roof type reflecting mirror is attached upon a mounting member which in turn is securely fixed to a camera body. The above reflecting mirror is secured in position upon the mounting member at the portions of the mirror exterior of the main body thereof and is correctly positioned by the abutment between the lower edges of the side walls of the reflecting mirror and the mounting member.

In one embodiment of the present invention, downwardly extended projections formed at the lower edges of the side walls of a penta-roof type reflecting mirror are fitted into holes of the mounting member so as to correctly position the reflecting mirror relative to the camera main body and the reflecting mirror is securedly fixed to the camera body at the portion of the main body of the mirror extended outwardly thereof.

In another embodiment of the present invention, the lower edges of the side walls of a penta-roof type reflecting mirror are fitted into the stepped portions of the mounting member thereby to correctly position the penta-roof type reflecting mirror, and the reflecting mirror is held in position by means of compression springs extended between the mounting member and the portions of the reflecting mirror exterior of the main body of the mirror.

In both of the above embodiments of the present invention, the mirror surfaces are not directly subjected to the force for mounting so that the mirror surfaces and the side edges of the reflecting mirror are not distorted at all.

In the second embodiment of the present invention, the portions upon which is mountd the penta-roof type reflecting mirror may be extended inwardly into the light entrance opening of the penta-roof type reflecting mirror so that diffused reflections at the peripheral portion of the ground glass or focusing plate of the viewfinder and in the vicinity of the side walls of the reflecting mirror are eliminated.

The above and other objects, features and advantages of the present invention become more apparent from the following description of illustrative embodiments thereof with reference to the accompanying drawings.

DESCRIPTION OF THE PREFERRED EMBODIMENT

Figure 1:
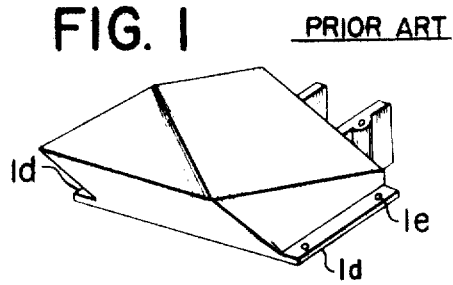
FIG. 1 is a perspective view of a conventional penta-roof type reflecting mirror.
Figure 2:
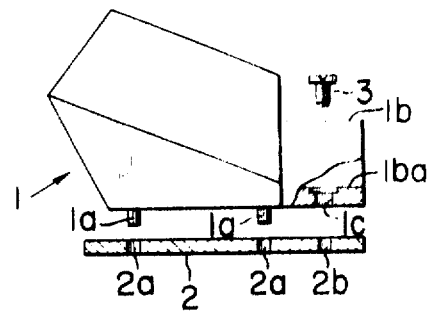
FIG. 2 is a fragmentary vertical sectional view of a view-finder in accordance with the present invention.
Figure 3:
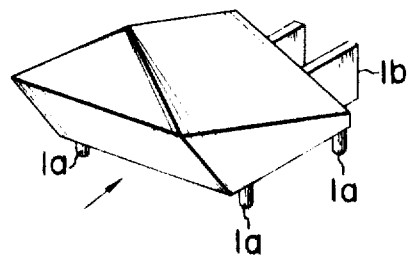
FIG. 3 is a perspective view of a penta-roof type reflecting mirror thereof.
Figure 4:
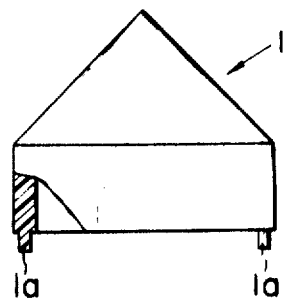
FIG. 4 is a front view thereof partly in section.

Referring to FIGS. 2 to 4, four projections $1a$ are extended from the corners of the underface of a penta-roof type reflecting mirror 1 and may be advantageously molded together with the above reflecting mirror 1 by making relatively shorter the ejection pins of the molds. An eyepiece mounting member $1b$ is extended from the rear portion of the reflecting mirror 1 and its floor wall $1ba$ is provided with a through bore $1c$. A penta-roof type reflecting mirror mounting plate 2 is provided with holes $2a$ into which are fitted the projections $1a$ of the reflecting mirror 1 and a tapped hole $2b$ into which is screwed a screw 3 extending through the bore $1c$. The mounting plate 2 may be securely fixed to a camera body (not shown) in any manner well known in the art. Next the projection $1a$ for the reflecting mirror 1 are fitted into the holes $2a$ and the reflecting mirror 1 is securely mounted upon the mounting plate 2 by the screw 3 extending through the bore $1c$ and screwed into the taped hole $2b$ of the plate 2.

Figure 6:
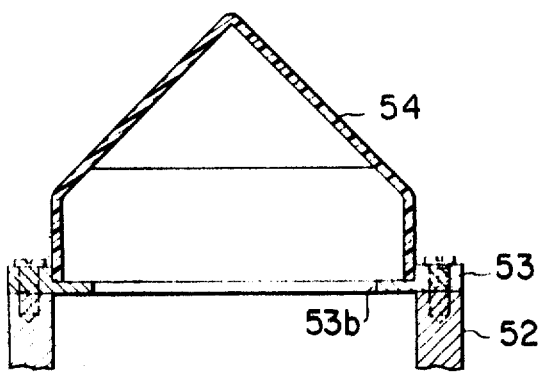
FIG. 6 is a vertical sectional view thereof.
Figure 5:
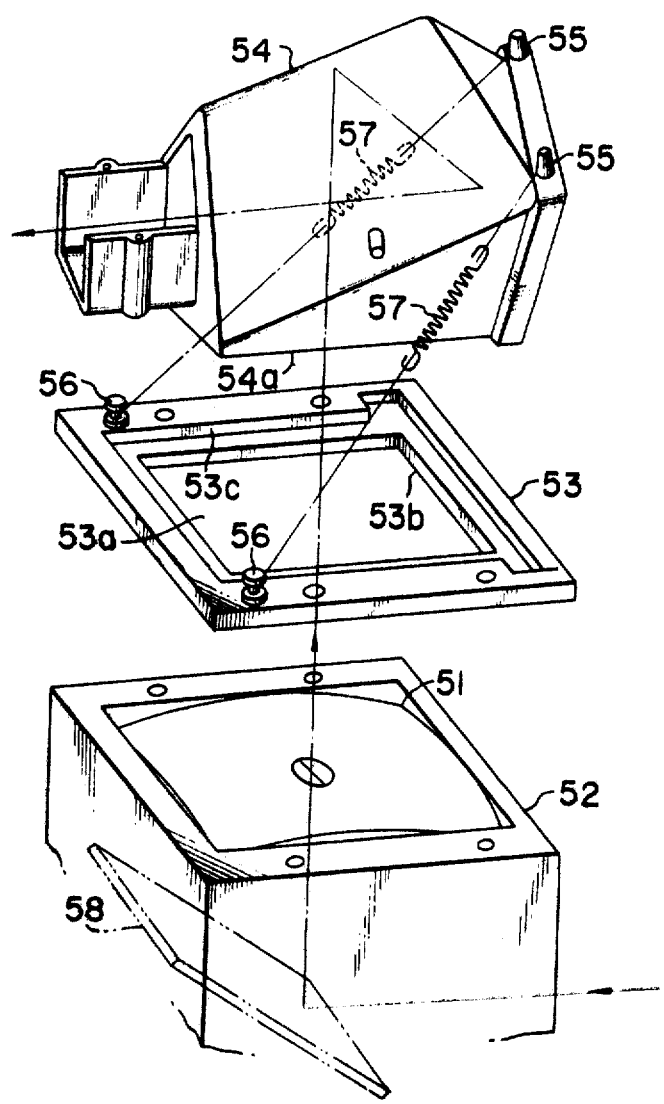
FIG. 5 is an exploded perspective view of another embodiment of the present invention.

In the second embodiment illustrated in FIGS. 5 and 6, a base plate or frame 53 is securely fixed to a camera body 52 having a ground glass 51 provided with a condenser. The base plate 53 has an opening $53a$ and projected portions or ridges $53b$ formed along the inner periphery of the base plate 53. When the base plate 53 is mounted upon the camera body 52, the base frame 53 serves to securely hold a ground glass in position by the projected portions $53b$. Between the uper surface of the frame 53 and the projected edge portions $53b$ are defined stepped portions $53c$ upon which is snugly fitted the lower side edges $54a$ of the light entrance opening of the penta-roof type reflecting mirror 54. That is, the penta-roof type reflecting mirror 54 may be positioned by the upper surfaces of projected edge portions $53b$ and the stepped portions $53c$, and the mirror 54 is resiliently coupled to the base frame 53 by means of compression springs 57 between pins 55 extended from the portion exterior of the main body of the reflecting mirror and pins 56 extended from the base frame 53 respectively. The light entering into the reflecting mirror 54 is designated by the broken line in FIG. 5 and travels in the direction indicated by the arrow.

The light is reflected by a reflecting mirror 58 and enters into the reflecting mirror 54. When the projected edge portions 53b of the plate 53 are arranged so as to extend into the light entrance opening of the reflecting mirror 54 to some extent as best shown in FIG. 6, they may effectively cut off the light incident upon the peripheral portion of the ground glass 51 and the portions in the vicinity of the side walls of the light entrance opening, thereby eliminating the diffused reflection of the light within the reflecting mirror 54.

We claim:

1. In combintion with a viewfinder for a single-lens reflex camera, a mounting structure for a viewfinder housing having therein a penta-roof type reflecting mirror system and having a lower edge surface comprising:

a mounting plate adapted to be secured to the camera, said mounting plate having a plurality of holes located therein;

a plurality of projections formed on a lower surface of said reflecting mirror, said projections corresponding in number and alignment location with said holes;

said projections being of a size to each respectively fit within a corresponding hole for mounting said viewfinder on the camera for precise location; and securing means connecting said reflecting mirror system housing with said mounting plate.

2. The mounting structure according to claim 1, wherein securing means connecting said housing and said mounting plate includes a tapped hole located adjacent one end of said mounting plate, and eyepiece mounting member extending from said housing and including a lower portion having an additional hole located therein that is aligned with said tapped hole when said projections are aligned with said holes, and a screw extending through said additional hole for engagement with said tapped hole.

3. In combination with a viewfinder for a single-lens reflex camera, a mounting structure for a viewfinder having a penta-roof type reflecting mirror system and including a housing having a lower edge surface, side surfaces and an upper surface comprising:

a mounting plate adapted to be secured to the camera, said mounting having an opening therein with an inner stepped periphery formed therearound comprising an inwardly directed ledge with a side ledge extending at right angles thereto;

said reflecting mirror system housing having its lower edge surface positioned on said inwardly directed edge and its lower side surfaces abutting the side ledges for precise location; and securing means connecting said reflecting mirror system housing with said mounting plate.

4. The mounting structure according to claim 3 wherein said securing means included a first pair of pins respectively mounted on opposite sides on the top surface of said reflecting mirror system housing, a second pair of pins respectively mounted on opposite sides on said side ledges, and a pair of springs respectively connected to each one of said first pair of pins to one of said second pair of pins.

References Cited

UNITED STATES PATENTS

| 3,218,946 | 11/1965 | Lange | 88—1.5 |
| 3,250,196 | 5/1966 | Ort et al. | 88—1.5 UX |

FOREIGN PATENTS

| 5,118 | 10/1955 | Germany. |

RONALD L. WILBERT, Primary Examiner

O. B. CHEW II, Assistant Examiner

UNITED STATES PATENT OFFICE
CERTIFICATE OF CORRECTION

Patent No. 3,618,449            Dated November 9, 1971

Inventor(s) Kenji Hiruma, et al.

It is certified that error appears in the above-identified patent and that said Letters Patent are hereby corrected as shown below:

Column 3, line 12,    change "combintion" to -- combination --;

Column 3, line 28,    after "in" insert -- said --;

Column 3, line 30,    change "and" to -- an --;

Column 4, line 18,    change "included" to -- includes --.

Signed and sealed this 16th day of May 1972.

(SEAL)
Attest:

EDWARD M. FLETCHER, JR.                ROBERT GOTTSCHALK
Attesting Officer                      Commissioner of Patents